United States Patent
Cho et al.

(10) Patent No.: US 7,372,603 B2
(45) Date of Patent: May 13, 2008

(54) MIRROR PACKAGE SCANNING APPARATUS AND METHOD

(75) Inventors: Jin Woo Cho, Seongnam-si (KR); Hwa Sun Lee, Suwon-si (KR); Young Chul Ko, Yongin-si (KR); Jin Ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 113 days.

(21) Appl. No.: 11/489,566

(22) Filed: Jul. 20, 2006

(65) Prior Publication Data

US 2007/0053035 A1    Mar. 8, 2007

(30) Foreign Application Priority Data

Sep. 8, 2005    (KR) ...................... 10 2005 0083697

(51) Int. Cl.
*G02B 26/08*    (2006.01)

(52) U.S. Cl. ........................ 359/201; 359/202

(58) Field of Classification Search ................ 359/201, 359/202, 212–214, 871, 872
See application file for complete search history.

(56) References Cited

U.S. PATENT DOCUMENTS 3,619,028 A * 11/1971 Keene et al. ............... 359/201
5,526,076 A * 6/1996 Walker ......................... 353/43
6,114,712 A * 9/2000 Dvorkis et al. ............. 250/566

FOREIGN PATENT DOCUMENTS

| JP | 10-253912 | 9/1998 |
| JP | 2003-004963 | 1/2003 |
| KR | 20-1999-0029487 | 7/1999 |
| KR | 10-2001-0065729 | 7/2001 |
| KR | 10-2004-0094810 | 11/2004 |
| WO | WO 01/33281 A1 | 5/2001 |
| WO | WO 02/05012 A2 | 1/2002 |

* cited by examiner

*Primary Examiner*—Euncha P. Cherry
(74) *Attorney, Agent, or Firm*—Staas & Halsey LLP

(57) ABSTRACT

An optical scanner system and method having a light source, a first mirror rotatable along a first torsion axis to reflect light from the light source, a first vibrator to vibrate the first mirror, a second mirror positioned adjacent to the first mirror and rotatable along a second torsion axis different from the first torsion axis, a second vibrator to vibrate the second mirror, and a mirror reflecting the light reflected from the first mirror to the second mirror. In addition, microminiaturization may be further embodied by applying an MEMS technology. Further, a vibrating body may be designed to vibrate with high frequencies by reducing the size and mass of the vibrating body. Through embodiments of the present invention, it is also possible to prevent interference between light entering a mirror package and the finally reflected light.

27 Claims, 7 Drawing Sheets

MIRROR PACKAGE SCANNING APPARATUS AND METHOD

CROSS-REFERENCE TO RELATED APPLICATIONS

This application claims the benefit of Korean Patent Application No. 10-2005-0083697, filed Sep. 8, 2005, in the Korean Intellectual Property Office, the disclosure of which is incorporated herein by reference.

BACKGROUND OF THE INVENTION

1. Field of the Invention

Embodiments of the present invention relate to an optical scanner changing the path of light. More particularly, embodiments of the present invention relate to a mirror package scanning apparatus having a simple structure and capable of two-dimensional scanning.

2. Description of the Related Art

An optical scanner is usually used to change the path of a laser, e.g., during the scanning of a two dimensional image. Such an optical scanner may further be easily used for a laser printer, a bar code reader, and the like. In addition, the optical scanner may perform more complicated operations such as complex image processing, e.g., for a laser television or the like. In such an environment, a laser may be provided along a certain path as a light source, so that a desired image may be obtained by two-dimensionally changing the path of the laser. A conventional method of using two mirrors, working with two respectively different axes, has been used so as to change the path of a laser. In addition, another method includes two-dimensionally changing the path of a laser by moving one mirror with two axes.

FIG. 1 illustrates a conventional optical system showing how the path of light can be changed by using two mirrors.

Referring to FIG. 1, the conventional scanner 10 includes a vertical projector 12 and a horizontal projector 14. Synthetic light may be modulated by image signals and reflected by the vertical projector 12, such that the path of synthetic light is changed in the up and down directions of a screen 16. The light reflected by the vertical projector 12 may again be reflected by the horizontal projector 14, so that the path of the light may be changed in the left and right directions of the screen 16. Here, the vertical projector 12 controls a rotation angle of a rotation shaft that is connected to a mirror, as a kind of Galvanometer, and changes the path of the modulated light in the up and down directions. To perform this horizontal scanning, the horizontal projector 14 rotates a polygon mirror and changes the path of the light in the left and right directions.

However, this scanner uses a general motor and occupies considerable space. Accordingly, it is difficult to manufacture such a scanner on a small scale. It is also difficult to reduce the noise and the vibration of the motor.

FIG. 2 illustrates another conventional method of changing the path of light using one mirror vibrating along two axes. This type of mirror may be manufactured by a MEMS process.

Referring to FIG. 2, the mirror 20 includes a reflector 22, a first torsion axis 23, an internal frame 24, a second torsion axis 25, and an external frame 26. The reflector 22 is coated to be reflective at the center of the mirror 20. The first torsion axis 23 is extended from the reflector 22 to opposite ends thereof. Here, the internal frame 24 is physically connected to the first torsion axis 23 and is provided around the reflector 22. The second torsion axis 25 is extended from the internal frame 24 and perpendicular to the first torsion axis 23. The external frame 26 is physically connected to the second torsion axis 25. First rotors are in the shape of a comb and provided on both ends of the reflector 22 at the center of the first torsion axis 23, with the first stators being in the shape of a comb and provided in the internal frame 24 in correspondence to the first rotors, and second rotors are in the shape of a comb and provided on both ends of the internal frame 24 at the center of the second torsion axis 25, with the second stators being in the shape of a comb and provided in the external frame 26 in correspondence to the second rotors.

As a high frequency of an alternating current is supplied to the reflector 22, the reflector 22 vibrates along the first torsion axis 23, i.e., in a seesaw manner. As a low frequency of another alternating current is supplied to the internal frame 24, the internal frame 24 may vibrate on the second torsion axis 25 at a relatively low frequency, compared to the vibration of the reflector 22. As a result, with such dual axial vibrations with a single mirror, image signals may be two-dimensionally distributed.

However, since the frequency of the reflector 22 is higher than the frequency of the internal frame 24, considering the characteristics of image signals, the electrodes for the reflector 22 and the internal frame 24 have to be insulated from each other and the shape of the electrodes may become very complicated. Electrodes are usually trenched, which may have a negative influence on the reliability of the structure. In addition, the reflector 22 and the internal frame 24 simultaneously vibrate on the second torsion axis 25. When this occurs, since the mass of the reflector 22 and the internal frame 24 is large, the reflector 22 and the internal frame 24 have to vibrate at relatively low frequencies, and it becomes very difficult to increase the frequency of the internal frame 24. In addition, a non-linearization of driving may occur and structural reliability problems may occur, due to dropping, impact and the like, for example.

SUMMARY OF THE INVENTION

To solve the aforementioned problems, embodiments of the present invention may include an optical scanner and a mirror package, capable of being embodied by microminiaturization.

In addition, embodiments of the present invention also include an optical scanner and a mirror package possessing a simple structure for easy electrode connections and easy manufacturing.

Embodiments of the present invention further include an optical scanner and a mirror package which can be designed to vibrate at a high frequency by reducing the size and mass of the vibrating bodies.

In addition, embodiments of the present invention also include an optical scanner and a mirror package which can prevent the loss and interference of light while light enters and leaves the mirror package.

To achieve the above and/or other aspects and advantage, embodiments of the present invention includes an optical scanner system, including a first mirror unit deformable along at least a first torsion axis to reflect incident light, a second mirror unit deformable along at least a second torsion axis that is different from the first torsion axis, and a third mirror unit reflecting light, reflected from the first mirror unit, to the second mirror unit, such that at least deformations of the first mirror unit and second mirror unit, with operations of the third mirror unit, are capable of generating a two dimensional scan of the light incident to the first mirror unit upon reflection from the second mirror unit.

The system may further include a light source to generate the light incident on the first mirror unit.

In addition, the system may include at least one deforming unit. The deforming unit further may include a first vibrator to vibrate the first mirror unit to rotate about the first torsion axis, and a second vibrator to vibrate the second mirror unit to rotate about the second torsion axis.

The first vibrator may include comb shaped first rotors provided on both sides of the first mirror unit and comb shaped first stators corresponding to the first rotors and provided to be reciprocal with the first rotors, and the second vibrator may include comb shaped second rotors provided on both sides of the second mirror unit, along a center of the second torsion axis, and comb shaped second stators corresponding to the second rotors and provided to be reciprocal with the second rotors.

The first and second vibrators may vibrate the first and second mirror units by using at least one of an electromagnetic force, an electrostatic force, a piezo-electric phenomenon or heat.

The third mirror unit may further have a fixed position.

Further, in the two dimensionally scanning of the light incident to the first mirror unit, upon reflection from the second mirror unit, the first mirror unit may generate a horizontal scan of the incident light incident to the first mirror unit and the second mirror unit may generate a vertical scan of light reflected from the third mirror unit.

The first mirror unit, the second mirror unit, and the third mirror unit, respectively, may each include single mirrors.

The first mirror unit and the second mirror unit may be provided within a same plane, and the third mirror unit is in another plane facing the first and second mirror units.

The second mirror unit may further be extended along one axis, compared to another axis of the second mirror unit, in a direction perpendicular to a direction of the first torsion axis, and a thickness of the second mirror unit may be formed to be less than a thickness of the first mirror unit.

To achieve the above and/or other aspects and advantage, embodiments of the present invention includes an optical scanner including a reflection module including a substrate, a horizontal scanning mirror unit suspended over the substrate and deformable along a first torsion axis, and a vertical scanning mirror unit suspended over the substrate and deformable along a second torsion axis which is perpendicular to the first torsion axis, a horizontal scanning vibrator to vibrate the horizontal scanning mirror unit with a certain frequency, a vertical scanning vibrator to vibrate the vertical scanning mirror unit with a frequency comparatively lower than the certain frequency of the horizontal scanning mirror unit, and a module cover including a transparent wall provided over the reflection module and a reflection coating zone facing the horizontal scanning mirror and the vertical scanning mirror below the transparent wall.

The optical scanner may further include a light source.

The horizontal scanning vibrator may include comb shaped first rotors formed on both sides of the horizontal scanning mirror unit and comb shaped first stators corresponding to the first rotors and provided to be reciprocal with the first rotors, and the vertical scanning vibrator may include comb shaped second rotors provided on both sides of the vertical scanning mirror unit along a center of the second torsion axis and comb shaped second stators corresponding to the second rotors and provided to be reciprocal with the second rotors.

A thickness of the vertical scanning mirror unit may be less than a thickness of the horizontal scanning mirror unit.

To achieve the above and/or other aspects and advantage, embodiments of the present invention includes a mirror package for two-dimensionally reflecting light from a light source, including a first mirror unit deformable along a first torsion axis to reflect light from a light source, a first vibrator to vibrate the first mirror unit, a second mirror unit deformable along a second torsion axis that is different from the first torsion axis, a second vibrator to vibrate the second mirror unit, and a third mirror unit to reflect light reflected from the first mirror unit to the second mirror unit, such that at least deformations of the first mirror unit and the second mirror unit, with operations of the third mirror unit, are capable of generating a two dimensional scan of the light incident to the first mirror unit upon reflection from the second mirror unit.

The first mirror unit and the second mirror unit may be within a same plane, and the third mirror unit is in another plane and faces the first and second mirror units.

In addition, the first vibrator may include comb shaped first rotors provided on both sides of the first mirror unit and comb shaped first stators corresponding to the first rotors and provided to be reciprocal with the first rotors, and the second vibrator may include comb shaped second rotors provided on both sides of the second mirror unit along a center of the second torsion axis and comb shaped second stators corresponding to the second rotors and provided to be reciprocal with the second rotors.

The first and second vibrators may vibrate the first and second mirror units by using at least one of an electromagnetic force, an electrostatic force, a piezo-electric phenomenon or heat.

The second mirror unit may be extended along one axis, compared to another axis of the second mirror unit, in a direction perpendicular to a direction of the first torsion axis, and a thickness of the second mirror unit may be less than a thickness of the first mirror unit.

To achieve the above and/or other aspects and advantage, embodiments of the present invention includes a mirror package for two-dimensionally reflecting light from a light source, including a package case having an open top, a reflection module including a substrate, within the package case, a horizontal scanning mirror unit suspended over the substrate and deformable along a first torsion axis, and a vertical scanning mirror unit suspended over the substrate and deformable along a second torsion axis which is perpendicular to the first torsion axis, a horizontal scanning vibrator to vibrate the horizontal scanning mirror unit with a certain frequency, a vertical scanning vibrator to vibrate the vertical scanning mirror unit with a frequency less than the frequency of the horizontal scanning mirror unit, and a module cover including a transparent wall covering the open top of the package case and a reflection coating zone facing the horizontal scanning mirror unit and the vertical scanning mirror unit below the transparent wall.

The horizontal scanning vibrator may include comb shaped first rotors provided on both sides of the horizontal scanning mirror unit and comb shaped first stators corresponding to the first rotors and provided to be reciprocal with the first rotors, and the vertical scanning vibrator may include comb shaped second rotors provided on both sides of the vertical scanning mirror unit along a center of the second torsion axis and comb shaped second stators corresponding to the second rotors and provided to be reciprocal with the second rotors.

Here, a thickness of the vertical scanning mirror unit may be less than a thickness of the horizontal scanning mirror unit.

To achieve the above and/or other aspects and advantage, embodiments of the present invention includes an optical scanner method, including reflecting light from a first mirror unit by deforming the first mirror unit along at least a first torsion axis to reflect incident light, reflecting light from a second mirror unit by deforming the second mirror unit along at least a second torsion axis that is different from the first torsion axis, reflecting light reflected from the first mirror unit to the second mirror unit, and generating a two dimensional scan of the light incident to the first mirror upon reflection from the second mirror unit through control of at least the deformations of the first mirror unit and second mirror unit, with operations of the third mirror unit.

The method may further include vibrating the first mirror unit to accomplish the deforming of the first mirror unit to rotate about the first torsion axis, and vibrating the second mirror unit to accomplish the deforming of the second mirror unit to rotate about the second torsion axis.

In the two dimensionally scanning of the light incident to the first mirror unit, upon reflection from the second mirror unit, the first mirror unit may generate a horizontal vertical scan of the incident light incident to the first mirror unit and the second mirror unit may generate a vertical scan of light reflected from the third mirror unit.

Here, the first mirror unit, the second mirror unit, and the third mirror unit, respectively, may each include single mirrors.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
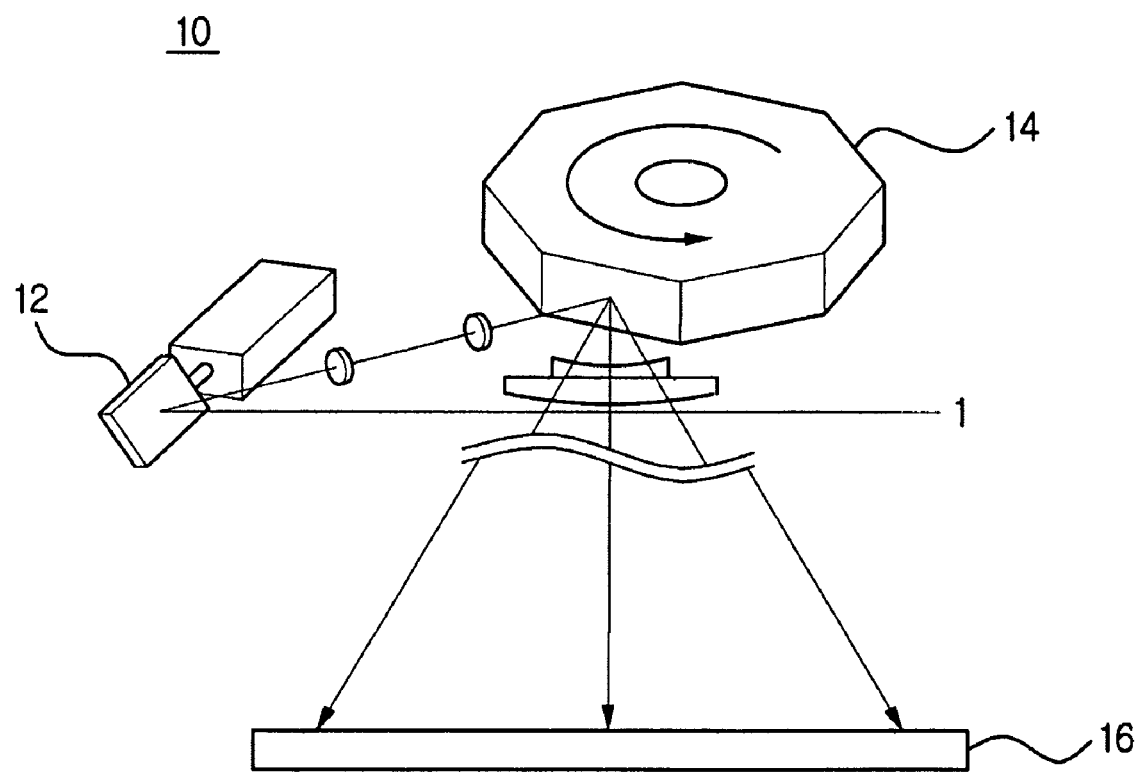
FIG. 1 illustrates a conventional optical system that changes the path of light by using two mirrors.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
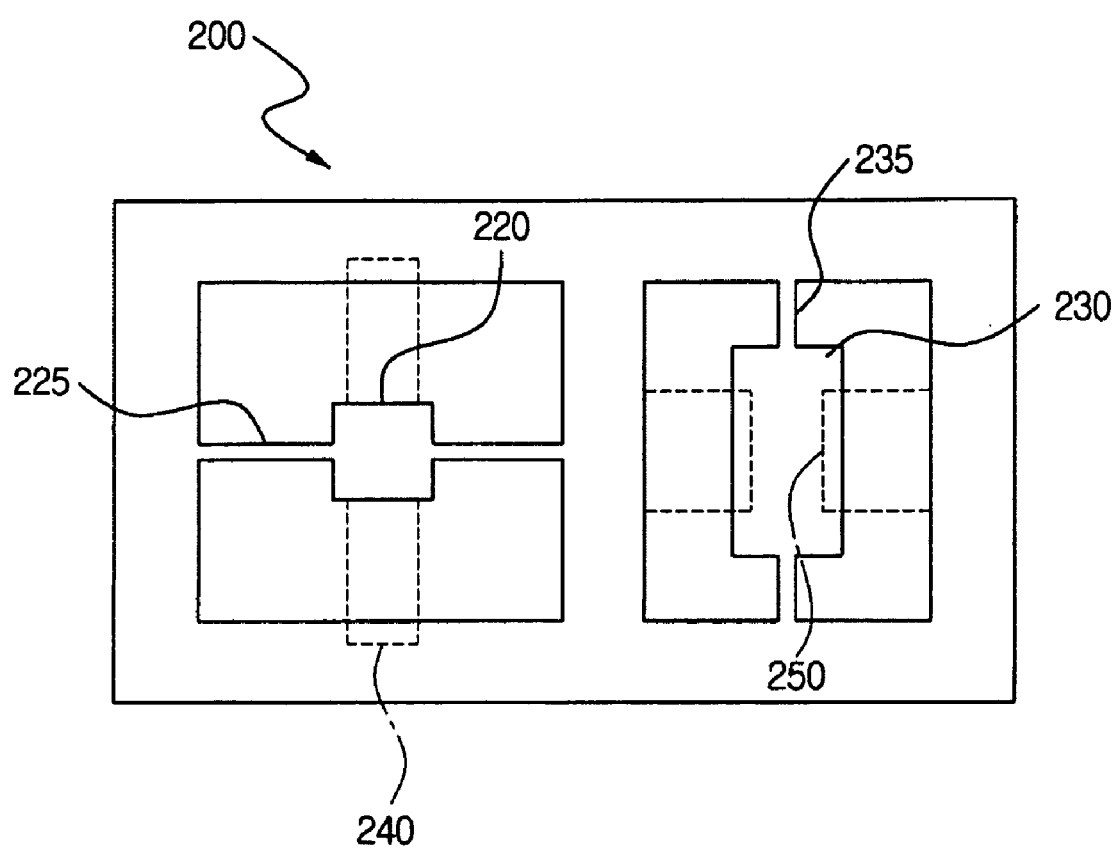
FIG. 3 illustrates an mirror package optical scanner, according to an embodiment of the present invention.
Figure 4:
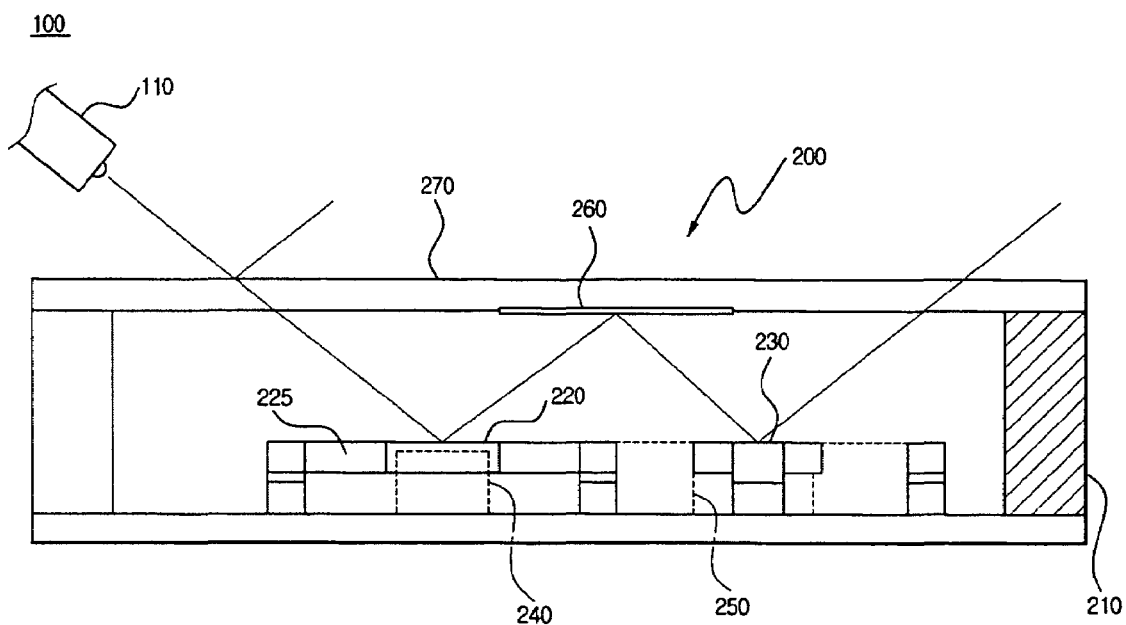
FIG. 4 illustrates a side view of the mirror package optical scanner of FIG. 3, according to an embodiment of the present invention.

FIG. 3 illustrates an mirror package optical scanner, according to an embodiment of the present invention, and FIG. 4 illustrates a side view of the same.

Referring to FIGS. 3 and 4, image equipment using a laser, for example, may include an optical scanner 100, with the optical scanner 100 including a light source 110 and a mirror package 200. The light source 110 may emit light and the mirror package 200 may two-dimensionally divide the scanning/reflecting of the emitted light, with each mirror performing a portion of the required reflecting operations. A modulator may be used to mix light formed of red, green, and blue colors, or combination of other colors, for example, and generate light for each pixel, as another example. The generated light may be provided directly from the light source 110. Thus, the directly emitted light may be horizontally and vertically dispersed via the mirror package 200, with light corresponding to each pixel being dispersed on a screen. In this manner, a two-dimensionally embodied picture may be provided.

According to an embodiment of the present invention, the light source 110, for example, may receive a light signal corresponding to an image signal from a modulator (not illustrated) and generate modulated light in accordance with the transmitted light signal. Here, the light emitted from the light source 110 may be projected on a screen via the mirror package 200.

The mirror package 200 may include at least a first mirror 220, a first vibrator 240, a second mirror 230 adjacent to the first mirror 220, a second vibrator 250, and a fixed mirror 260, for example, noting that the fixed mirror 260 is not required to be fixed. The first vibrator 240 vibrates the first mirror 220 like a seesaw about the first torsion axis 225, the second vibrator 250 also vibrates the second mirror 230 like a seesaw, about the second torsion axis 235, and the fixed mirror 260 may be provided between the first mirror 220 and the second mirror 230 to reflect light therebetween. Light from the light source 110 may be emitted to the first mirror 220, where the first mirror 220 may be made to vibrate along the first torsion axis 225. Accordingly, light reflected from the first mirror 220 may be dispersed, in a first angle range by the vibrating first mirror 220 to the fixed mirror 260. Light reflected from the fixed mirror 260 to the second mirror 230, which similarly may be made to vibrate along the second torsion axis 235. Accordingly, light subsequently reflected from the second mirror 230 may be dispersed in a second angle range, which is perpendicular to the first angle range, by the second mirror 230, to ultimately output the multi-reflected light, e.g., to a screen as the two-dimensional image. Here, the first torsion axis 225 may be oriented to not be in parallel with the second torsion axis 235. Namely, the first torsion axis 225 and the second torsion axis 235 may be provided to be perpendicular to each other, though this is not necessary.

Thus, the first torsion axis 225 and the second torsion axis 235 may permit the first mirror 220 and second mirror 230, respectively, to be deformable, e.g., rotatable, about the respective axes.

Generally, light may be horizontally dispersed by making the first mirror 220 vibrate along the first torsion axis 225, and the horizontally dispersed light may further be vertically dispersed by making the second mirror 230 vibrate along the second torsion axis 235. In this manner, light may be emitted to provide a two-dimensional image, to read two-dimensional information, for example. Additional embodiments are equally available. As described above, at least two torsion axes may generally be provided, perpendicular to each other. However, as noted above, in some cases, a desired two-dimensional image may be obtained by providing two torsion axes oriented according to an angle which is neither perpendicular nor parallel.

According to an embodiment of the present invention, and as illustrated in FIG. 4, the first mirror 220 and the second mirror 230 of the mirror package 200 may be manufactured by a microstructure manufacturing method using etching, for example. The first mirror 220 and the second mirror 230 may be made by using silicon and the like. Metals or a dielectric layer may be provided on the top of the first mirror 220 and the second mirror 230 in multiple layers, for example, so as to give reflectivity thereto. In this instance, the metals may include at least one of aluminum (Al), antigen (Ag), aurum (Au), chromium (Cr), and the like, for example.

The first mirror 220 and the second mirror 230 may be fixed to square frames by the first torsion axis 225 and the second torsion axis 235. Accordingly, the first mirror 220 may be formed to be rotatable along the first torsion axis 225 and may be made to vibrate along the first torsion axis 225, e.g., like a seesaw. Also, the second mirror 230 may be formed to be rotatable along the second torsion axis 235 and may be made to vibrate along the second torsion axis 235, again, like a seesaw. In this instance, the second torsion axis 235 may be provided to be perpendicular to the first torsion axis 225, and the mirror package 200 may horizontally and vertically split light scanning.

The first vibrator 240 may be provided along each side of the first mirror 220 along the center of the first torsion axis 225, for example. The first vibrator 240 may be made to vibrate the first mirror 220 within a predetermined angle, to vibrate the first mirror 220 at a predetermined frequency, for example, by using an electromagnetic force, an electrostatic force, a piezo-electric material or heat, noting that alternative embodiments are equally available. The first torsion axis 225 and the first mirror 220 may be integrally formed, and the first torsion axis 225 may be a type of a torsion spring, giving restoring force with respect to distortion of the first mirror 220, for example. Similarly, the second torsion axis 235 and the second mirror 230 may be integrally formed, with the second torsion axis 235 giving restoring force with respect to distortion of the second mirror 230.

In an embodiment of the present embodiment, the first mirror 220, the second mirror 230, the first torsion axis 225 and the second torsion axis 235 may be provided on the same substrate, again noting that alternative embodiments are available. Also, a reflection module may be manufactured as a chip, e.g., by applying a conventional semiconductor manufacturing processes, such as etching or the like. The reflection module in the shape of an IC chip may be received in a case 210, for example, and a mirror package 200 may be manufactured to have a small size by covering the top of the case 210 with a module cover 270 made of glass or transparent resin, for example. In this instance, reflecting materials could be coated on the bottom of the module cover 270 to form the fixed mirror 260. The fixed mirror 260 may reflect light reflected from the first mirror 220 onto the second mirror 230. In this instance, the fixed mirror 260 may face the first mirror 220 and the second mirror 230, e.g., in a fixed position and parallel both the first and second mirrors 220 and 230, for example.

The first mirror 220 and the second mirror 230 may also be suspended over the substrate. Accordingly, the first mirror 220 may rotate along the first torsion axis 225, and horizontally disperse light emitted from the light source 110, and the second mirror 230 may rotate along the second torsion axis 235 to two-dimensionally disperse the horizontally dispersed light from the first mirror 220 in the vertical direction to together generate a two dimensional image and/or to read a two dimensional image.

As an example, when the diameter of the light source is d, the first mirror 220 and the second mirror 230 may be provided within the same plane, an incident angle of light from the first mirror 220 may be $\theta$, the first mirror 220 may move within an angle of about $\pm\Omega$, and the fixed mirror 260 may be spaced apart from the first mirror 220 and the second mirror 230 by certain height h, the light dispersed by the first mirror 220 may be dispersed to the second mirror 230 with a certain width of about $4h*\tan\Omega\cos\theta+d$. This may be a factor in determining the size of the second mirror 230. Here, it may be possible to prevent the size of the second mirror 230 from having to increase unnecessarily by reducing the height h of the mirror package 200, for example.

Similar to above, when the second mirror 230 moves through an angle range of about $\psi$, and the second mirror 230 and a screen (not illustrated) are spaced apart from each other by distance H, the size of a picture projected on the screen via the second mirror 230 may be about $4H*\tan\Omega\cos\theta$ in width and about $2H*\tan\psi/(1-\tan\theta\tan\psi)$ in height, for example. Namely, the size of the picture may be determined based on the horizontal driving angle $\Omega$ and vertical driving angle $\psi$. Generally, when the driving angle is increased, the size of the picture may also increase.

As described above, the first mirror 220 may be formed in the shape of an oval having a wider height equal to or larger than the diameter of the light source, according to one embodiment of the present invention. However, the second mirror 230 may have to be designed to have a width longer than the length of a trace of the light hitting the second mirror 230, for example. Accordingly, the second mirror 230 may be much larger than the first mirror 220, and, in the case of having the same thickness, the second mirror 230 may be much heavier than the first mirror 220. Accordingly, with a corresponding increase in inertia the second mirror 230 may be more difficult to vibrate at the desired higher frequency. Thus, the first mirror 220 may generally be used for horizontal scanning, requiring a higher frequency, and the second mirror 230 may be used for vertical scanning, requiring, comparatively, a lower frequency.

Here, the vibrating frequencies of the first mirror 220 and the second mirror 230 may define the resolution of a picture. Accordingly, a mirror package having a higher frequency and a larger driving angle may be provided in order to embody a high definition picture. In particular, the mass of torsion axes and mirrors should be smaller in order to permit increases in the frequencies of the first mirror 220 and the second mirror 230. In an embodiment, the two mirrors being separated, in addition to the aforementioned advantages, permits a reduction in the mass of each mirror and torsion axis, and thereby permits an increase in the frequency of respective vibrations for each mirror.

Figure 2:
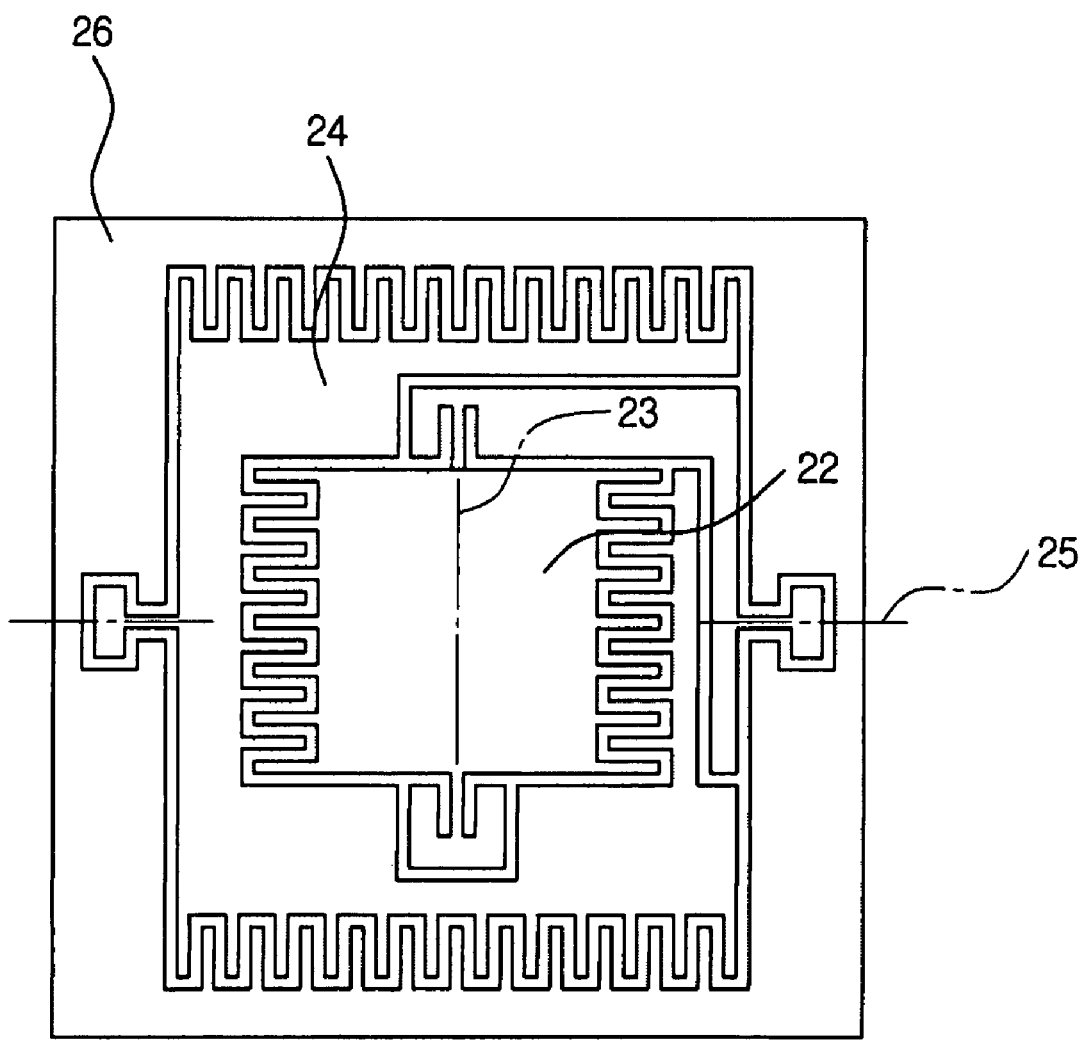
FIG. 2 illustrates a conventional method of moving one mirror through two axes to change the path of light.

As illustrated in FIG. 2, a conventional mirror package uses one mirror and a two-dimensional scanning actuator. In this conventional case, while light enters, a portion of the incident light may be directly reflected from a module cover and directly projected on a screen. Accordingly, a defective pixel may be displayed on the screen because of the straying of light, and, in order to remove the corresponding defective pixel display, a structure capable of cutting off the stray light may be needed adjacent to the mirror package. However, in this conventional mirror package, the distance between an entrance and exit of light is very small. In this instance, the entrance of light corresponds to the place where light enters and the exit of light is the place where the light is finally reflected out. Accordingly, it is very difficult to provide a needed separate structure. To solve this problem, in the conventional system, a tiltable transparent module cover was used. However, this method further increases overall packaging costs and enlarges the size of the system.

However, in an embodiment of the present embodiment, the mirror package 200 reflects light at least three times by using the fixed mirror 260. Accordingly, the distance between an entrance and an exit of light in the mirror package 200 is comparatively longer. Accordingly, in the mirror package 200, there is a structure capable of shielding from the straying of light, which can be easily installed adjacent to the mirror packaging. Thus, according to an embodiment of the present invention, it is not necessary to tilt the module cover 270 for packaging. Accordingly, the packaging of the system may be completed more simply and inexpensively.

Figure 5:
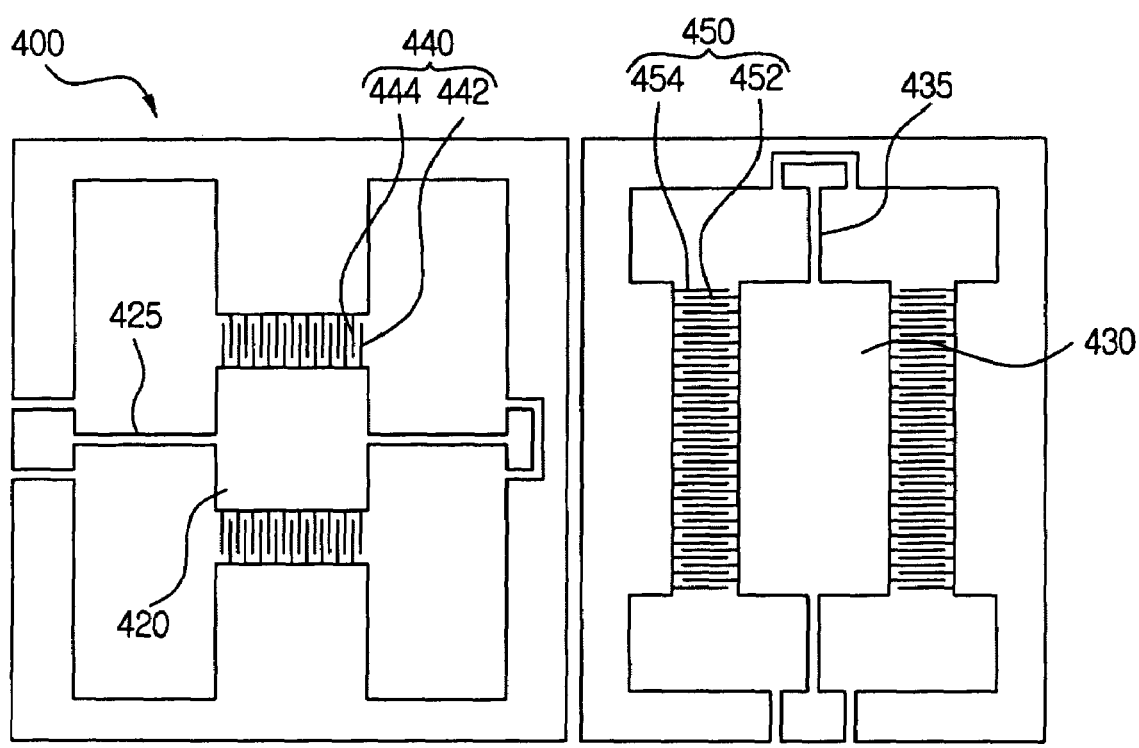
FIG. 5 illustrates an mirror package optical scanner, according to an embodiment of the present invention.
Figure 6:
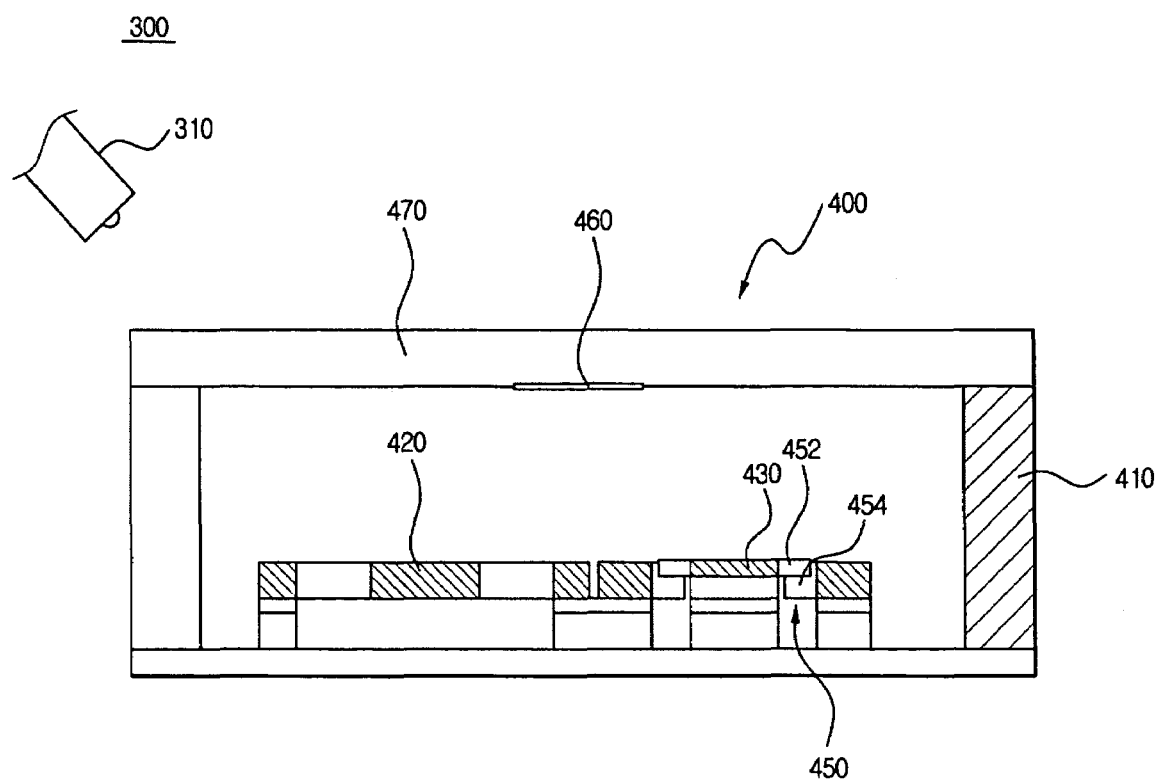
FIG. 6 illustrates a side view of the mirror package optical scanner of FIG. 5.
Figure 7:
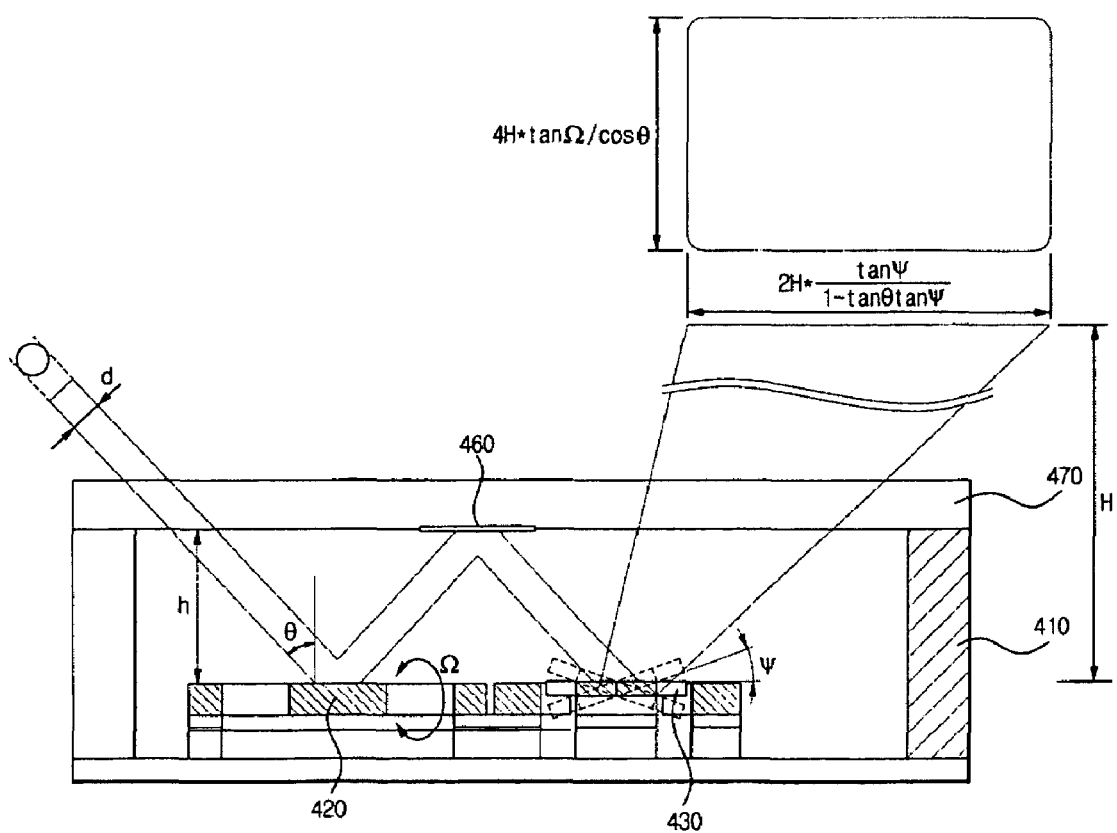
FIG. 7 illustrates a side view of a mirror package optical scanner explaining how to use the mirror package optical scanner, according to an embodiment of the present invention.

FIG. 5 illustrates an mirror package optical scanner, according to an embodiment of the present invention, with FIG. 6 being a side view of the same mirror package optical scanner, and FIG. 7 being a side view of a mirror package optical scanner explaining how to use the mirror package optical scanner, according to an embodiment of the present invention.

Referring to FIGS. 5 and 6, an optical scanner 300 may include a light source 310 and a mirror package 400, with the light source 310 emitting light and the mirror package 400 two-dimensionally dispersing the emitted light. A modulator may be used to mix light of red, green, and blue colors or a combination of other colors, for example, in accordance with an image signal and generate light for each pixel, for example. The modulator may provide the generated light in a straight line via the light source 310, and the straightly emitted light may be horizontally and vertically dispersed via the mirror package 400. Light corresponding to each pixel may, thus, be dispersed onto a screen, for example. In this manner, a two-dimensionally embodied picture may be provided.

The mirror package 400 may include a first mirror 420, a first vibrator 440, a second mirror 430 adjacent to the first mirror 420, a second vibrator 450, and a fixed mirror 460. The first vibrator 440 may vibrate the first mirror 420, e.g., like a seesaw, the second vibrator 450 vibrates the second mirror 430, e.g., like a seesaw, and the fixed mirror 460 may be provided between the first mirror 420 and the second mirror 430 to reflect light therebetween. Light from the light source 310 may be emitted to the first mirror 420, and the first mirror 420 may be made to vibrate along a first torsion axis 425. Accordingly, light reflected from the first mirror 420 may be dispersed within a first angle range, by the vibrating first mirror 420, and the light reflected from the first mirror 420 may be emitted to the second mirror 430 via the fixed mirror 460. In this instance, the second mirror 430 may be made to vibrate along a second torsion axis 435, such that light reflected from the second mirror 430 is dispersed in a second angle range, which may be perpendicular to the first angle range, by the second mirror 430. According to an embodiment of the present invention, the first mirror 420 and the second mirror 430 may be formed using a silicon on insulator (SOI) substrate and manufactured to have a small size by using a micro-electromechanical system (MEMS) technology. The SOI substrate may be a substrate in which an insulator layer is provided between two silicon layers. Also, the first torsion axis 425 and the second torsion axis 435 may be integrally formed with the first mirror 420 and the second mirror 430, and may be oriented to be perpendicular to each other, for example. In this manner, light emitted from the light source 310 may be dispersed in two perpendicular vectors, for example. Generally, light may be horizontally scanned by the vibrating first mirror 420, and then the horizontally scanned light from the first mirror 220 may be vertically scanned by the vibrating second mirror 430. In this manner, light may be emitted to provide a two-dimensional image or may be used for reading two-dimensional information.

Referring to FIG. 5, the first mirror 420 and the second mirror 430 of such a mirror package 400 may be manufactured by a microstructure manufacturing method using etching, for example. Further, the first mirror 420 and the second mirror 430 may be made by using silicon and the like. Metals or a dielectric layer may be provided on the top of the first mirror 420 and the second mirror 430 in multiple layers, so as to give reflectivity thereto. In this instance, the metals may include aluminum (Al), antigen (Ag), aurum (Au), chromium (Cr), and the like.

According to an embodiment of the present invention, the first mirror 420 and the second mirror 430 may float over the substrate and be integrally formed with the first torsion axis 425 and the second torsion axis 435, respectively. The first mirror 420 and the second mirror 430 may be fixed to supporting structures by the first torsion axis 425 and the second torsion axis 435. Here, the first mirror 420 may be formed to be rotatable along the first torsion axis 425 and may be made to vibrate along the first torsion axis 425, e.g., like a seesaw. Similarly, the second mirror 430 may be formed to be rotatable along the second torsion axis 435 and may be made to vibrate along the second torsion axis 435, e.g., like a seesaw. In this instance, the first and the second torsion axes 425 and 435 may be formed in the shape of a straight line, but may have various shapes, such as, a meander spring, a distorted shape, and the like, for example, noting that alternate embodiments are equally available.

The first vibrator 440 may be provided along each side of the first mirror 420 at the center of the first torsion axis 425, such that the first vibrator 440 is made to vibrate the first mirror 420 within a predetermined angle range. The first vibrator 440 may includes first rotors 442 and first stators 444, with the first rotors 442 and the first mirror 420 being integrally formed and the first stators 444 being formed on a frame. In this embodiment, the first rotors 442 may have the shape of a comb having a plurality of cantilevers, in parallel. Also, the first rotors 442 may further be made of the same silicon as the first mirror 420 and provided along an upper silicon portion of the SOI substrate. The first stators 444 may have the shape of a comb having a plurality of cantilevers in parallel and provided along a lower silicon portion of the SOI substrate. The first rotors 442 may be provided to reciprocate with the first stators 444, and, when an AC power is supplied to any one of the first rotors 442 or the first stators 444, vibrations of ten thousands of hertz (Hz), for example, may be performed. In this embodiment, the first rotors 442 may be formed along both sides of the first mirror 420, but in alternate embodiments, the first rotor may be formed by using the first torsion axis 425 or another connecting structure that is integrally formed with the first mirror 420, for example.

The second vibrator 450 may be provided along each side of the second mirror 430 along the center of the second torsion axis 435, such that the second vibrator 450 may be made to vibrate the second mirror 430 within a predetermined angle range. The second vibrator 450 may include second rotors 452 and second stators 454, with the second rotors 454 and the second mirror 430 being integrally formed and the second stators 454 being formed on a frame. The second rotors 452 may have the shape of a comb having a plurality of cantilevers. In addition, the second rotors 452 may be made of the same material as the second mirror 430 and provided on an upper silicon portion of the SOI substrate. The second stators 454 may be provided to reciprocate with the second rotors 452 and may be provided along a lower silicon portion of the SOI substrate. When an AC power is supplied, the second mirror 430 may perform vibrations of about 60 Hz, for example, noting again that alternate embodiments are equally available.

In an embodiment of the present invention, the first mirror 420, the second mirror 430, the first torsion axis 425 and the second torsion axis 435 may be provided on the same substrate by using an identical process. Further, a reflection module may be manufactured as a chip by applying a conventional semiconductor process, such as etching or the like, for example. The reflection module, in the form of a chip, may be received in a case 410. The mirror package 400 may be manufactured to have a small size by covering the top of the case 410 with a module cover 470, for example, e.g., made of glass or transparent resin. In this instance, reflecting materials may be coated along the bottom of the module cover 470 to form the fixed mirror 460, with the fixed mirror 460 reflecting light between the first mirror 420 and the second mirror 430. In this instance, the fixed mirror 460 may face, for example, the first mirror 420 and the second mirror 430 in a fixed position and may be parallel to both of the first and second mirrors 420 and 430.

Further, as noted above, the first mirror 420 and the second mirror 430 may be floating over the substrate, such that the first mirror 420 may rotate along the first torsion axis 425, and horizontally disperse light emitted from the light source 310, while the second mirror 430 may rotate along the second torsion axis 435 and two-dimensionally disperse the horizontally dispersed light by the first mirror 420 in the vertical direction. Also, since a silicon pattern may be used to make up the body of the first mirror 420 and the second mirror 430 and may electrically connect the same to the outside, necessary power may easily be supplied.

Referring to FIG. 7, illustrated d correspond to the diameter of the light source, θ is an incident angle of light, Ω is a rotation angle of the first mirror 420, ψ is a rotation angle of the second mirror 430, and h is the distance between the first and second mirrors 420 and 430 and the fixed mirror 460. When the first mirror 420 and the second mirror 430 are provided in the same plane, the pathway of light entering the second mirror 430, via the fixed mirror 460, may have a certain width of about 4h*tan Ω cos θ+d. Accordingly, the length of the second mirror 430 may have to be longer than the first mirror 420. In this instance, it is possible to prevent the size of the second mirror 430 from increasing unnecessarily by reducing the height h of the mirror package 400.

Also, in a portion where a screen is spaced apart from the first and second mirrors 420 and 430 by distance H, the size of a picture may be estimated to be about 4H*tan Ω cos θ in width and about 2H*tan ψ/(1−tan θ tan ψ) in length. Namely, the size of the picture may be determined based on the horizontal driving angle Ω and the vertical driving angle ψ. Generally, when the driving angle is increased, the size of the picture also increases.

As described above, the first mirror 420 may be formed in the shape of an oval having a wider height equal to or larger than the diameter of the light source. However, the second mirror 430 may have to be designed to have a width longer than the length of a trace of the light hitting the second mirror 430. Accordingly, the second mirror 430 may be much larger than the first mirror 420, and, when the two mirrors have the same thickness, the second mirror 430 may be much heavier than the first mirror 420. In addition, as the respective inertia increases, it becomes more difficult to vibrate the second mirror 430 at a higher frequency. Thus, the first mirror 420 may generally be used for horizontal scanning, which usually uses higher frequencies, and the second mirror 430 may be used for vertical scanning, which usually uses comparatively lower frequencies. Further, in this case, when the second mirror 430 vibrates at the lower frequency, its dynamic distortion actually becomes small. Accordingly, as illustrated in FIG. 5, the second mirror 430 may actually be formed to be thinner than the first mirror 420, thereby reducing the mass of the second mirror 430, and thereby improving frequency characteristics for the second mirror 430.

The frequencies applied to the first mirror 420 and the second mirror 430 may determine the resolution of a picture. Accordingly, a mirror package having higher frequencies may have to be used to generate a high definition picture. Accordingly, in this case, the mass of torsion axes and mirrors should be made to be small to increase the number of vibrations available with the first mirror 420 and the second mirror 430. According to an embodiment of the present invention, two mirrors may be separated to reduce mass of each mirror and torsion axis, while further permitting the vibration frequency of each mirror to be increased.

In addition, according to an embodiment of the present invention, the mirror package 400 may reflect light at least three times by using the fixed mirror 460. Accordingly, it is possible increase the distance between an entrance of light and an exit of light in the mirror package 400 over conventional systems. Further, the mirror package 400 would not need a structure to shield light directly reflected from the module cover 470, as necessary in conventional systems. Rather, a shielding structure can be installed easily within a sufficiently small space, without requiring the module cover 470 to be tilted for packaging, resulting in the packaging being completed more simply and inexpensively.

As described above, an optical scanner and a mirror package, according to an embodiment of the present invention, may be manufactured to have a small size by using an MEMS technology. Further, the size of a vibrating body may be further reduced by separating cells making up the first mirror and second mirror.

In addition, since each cell may be made to be small, the mass of a first mirror and a second mirror can similarly be reduced, which permits for higher frequencies than conventional systems. Thus, according to an embodiment of the present invention, the number of vibrations may be variously designed between tens of kHz and 60 Hz, for example. Accordingly, through the high frequency design, displays of high quality may be manufactured.

In addition, unlike conventional two-dimensional scanning actuators, a first mirror and a second mirror may be separated from each other and may have simpler shape than conventional systems, increasing the ease of manufacturing. In another advantage, when electrically connecting corresponding electrodes, an optical scanner and the like may be easily manufactured without complications.

The distance between an entrance and exit of light may be easily controlled using a fixed mirror interposed between the first and second mirrors. Accordingly, a structure capable of cutting off light may not be needed or may be provided very easily. In addition, embodiments of the present invention may separate the stray light and the light leaving the package efficiently. Conversely, to solve the problem described above, conventionally, the packaging had to employ a tilted cover. However, in embodiments of the present invention, excellent results may be realized without tilting, thereby reducing manufacturing costs.

With the above being said, it is thus possible to make an available chip which is about 30% smaller than conventional chips using one mirror for two-dimensional scanning, according to an embodiment of the present invention. Accordingly, the number of chips per wafer may increase by up to about 43% or more, for example. With the structure of the chip being simplified, defect rates may also be reduced.

In a mirror package, according to an embodiment of the present invention, there is almost no leakage, which may occur in conventional chips. Accordingly, the thickness of an insulation layer made of silicon dioxide ($SiO_2$), for example, may be thinner than conventional systems. Similarly, the thickness of other insulation layers may also be made thinner. Accordingly, the overall difficulty of such a process may be further reduced compared to conventional systems.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical scanner system, comprising:
   a first mirror unit deformable along at least a first torsion axis to reflect incident light;
   a second mirror unit deformable along at least a second torsion axis that is different from the first torsion axis; and
   a third mirror unit reflecting light, reflected from the first mirror unit, to the second mirror unit, such that at least deformations of the first mirror unit and second mirror unit, with operations of the third mirror unit, are capable of generating a two dimensional scan of the light incident to the first mirror unit upon reflection from the second mirror unit.

2. The system of claim 1, further comprising a light source to generate the light incident on the first mirror unit.

3. The system of claim 1, further comprising at least one deforming unit.

4. The system of claim 3, wherein the deforming unit further comprises:
   a first vibrator to vibrate the first mirror unit to rotate about the first torsion axis; and
   a second vibrator to vibrate the second mirror unit to rotate about the second torsion axis.

5. The system of claim 4, wherein
   the first vibrator comprises comb shaped first rotors provided on both sides of the first mirror unit and comb shaped first stators corresponding to the first rotors and provided to be reciprocal with the first rotors, and
   the second vibrator comprises comb shaped second rotors provided on both sides of the second mirror unit, along a center of the second torsion axis, and comb shaped second stators corresponding to the second rotors and provided to be reciprocal with the second rotors.

6. The system of claim 4, wherein the first and second vibrators vibrate the first and second mirror units by using at least one of an electromagnetic force, an electrostatic force, a piezo-electric phenomenon or heat.

7. The system of claim 1, wherein the third mirror unit has a fixed position.

8. The system of claim 1, wherein, in the two dimensionally scanning of the light incident to the first mirror unit, upon reflection from the second mirror unit, the first mirror unit generates a horizontal scan of the incident light incident to the first mirror unit and the second mirror unit generates a vertical scan of light reflected from the third mirror unit.

9. The system of claim 8, wherein the first mirror unit, the second mirror unit, and the third mirror unit, respectively, each comprise single mirrors.

10. The system of claim 1, wherein the first mirror unit and the second mirror unit are provided within a same plane, and the third mirror unit is in another plane facing the first and second mirror units.

11. The system of claim 1, wherein the second mirror unit is extended along one axis, compared to another axis of the second mirror unit, in a direction perpendicular to a direction of the first torsion axis, and a thickness of the second mirror unit is formed to be less than a thickness of the first mirror unit.

12. An optical scanner comprising:
   a reflection module including a substrate, a horizontal scanning mirror unit suspended over the substrate and deformable along a first torsion axis, and a vertical scanning mirror unit suspended over the substrate and deformable along a second torsion axis which is perpendicular to the first torsion axis;
   a horizontal scanning vibrator to vibrate the horizontal scanning mirror unit with a certain frequency;
   a vertical scanning vibrator to vibrate the vertical scanning mirror unit with a frequency comparatively lower than the certain frequency of the horizontal scanning mirror unit; and
   a module cover comprising a transparent wall provided over the reflection module and a reflection coating zone facing the horizontal scanning mirror and the vertical scanning mirror below the transparent wall.

13. The optical scanner of claim 12, further comprising a light source.

14. The optical scanner of claim 12, wherein:
   the horizontal scanning vibrator comprises comb shaped first rotors formed on both sides of the horizontal scanning mirror unit and comb shaped first stators corresponding to the first rotors and provided to be reciprocal with the first rotors, and
   the vertical scanning vibrator comprises comb shaped second rotors provided on both sides of the vertical scanning mirror unit along a center of the second torsion axis and comb shaped second stators corresponding to the second rotors and provided to be reciprocal with the second rotors.

15. The optical scanner of claim 12, wherein a thickness of the vertical scanning mirror unit is less than a thickness of the horizontal scanning mirror unit.

16. A mirror package for two-dimensionally reflecting light from a light source, comprising:
   a first mirror unit deformable along a first torsion axis to reflect light from a light source;
   a first vibrator to vibrate the first mirror unit;
   a second mirror unit deformable along a second torsion axis that is different from the first torsion axis;
   a second vibrator to vibrate the second mirror unit; and
   a third mirror unit to reflect light reflected from the first mirror unit to the second mirror unit, such that at least deformations of the first mirror unit and the second mirror unit, with operations of the third mirror unit, are capable of generating a two dimensional scan of the light incident to the first mirror unit upon reflection from the second mirror unit.

17. The mirror package of claim 16, wherein the first mirror unit and the second mirror unit are within a same plane, and the third mirror unit is in another plane and faces the first and second mirror units.

18. The mirror package of claim 16, wherein:
the first vibrator comprises comb shaped first rotors provided on both sides of the first mirror unit and comb shaped first stators corresponding to the first rotors and provided to be reciprocal with the first rotors, and
the second vibrator comprises comb shaped second rotors provided on both sides of the second mirror unit along a center of the second torsion axis and comb shaped second stators corresponding to the second rotors and provided to be reciprocal with the second rotors.

19. The mirror package of claim 16, wherein the first and second vibrators vibrate the first and second mirror units by using at least one of an electromagnetic force, an electrostatic force, a piezo-electric phenomenon or heat.

20. The mirror package of claim 16, wherein the second mirror unit is extended along one axis, compared to another axis of the second mirror unit, in a direction perpendicular to a direction of the first torsion axis, and a thickness of the second mirror unit is less than a thickness of the first mirror unit.

21. A mirror package for two-dimensionally reflecting light from a light source, comprising:
a package case having an open top;
a reflection module comprising a substrate, within the package case, a horizontal scanning mirror unit suspended over the substrate and deformable along a first torsion axis, and a vertical scanning mirror unit suspended over the substrate and deformable along a second torsion axis which is perpendicular to the first torsion axis;
a horizontal scanning vibrator to vibrate the horizontal scanning mirror unit with a certain frequency;
a vertical scanning vibrator to vibrate the vertical scanning mirror unit with a frequency less than the frequency of the horizontal scanning mirror unit; and
a module cover comprising a transparent wall covering the open top of the package case and a reflection coating zone facing the horizontal scanning mirror unit and the vertical scanning mirror unit below the transparent wall.

22. The mirror package of claim 21, wherein:
the horizontal scanning vibrator comprises comb shaped first rotors provided on both sides of the horizontal scanning mirror unit and comb shaped first stators corresponding to the first rotors and provided to be reciprocal with the first rotors, and
the vertical scanning vibrator comprises comb shaped second rotors provided on both sides of the vertical scanning mirror unit along a center of the second torsion axis and comb shaped second stators corresponding to the second rotors and provided to be reciprocal with the second rotors.

23. The mirror package of claim 21, wherein a thickness of the vertical scanning mirror unit is less than a thickness of the horizontal scanning mirror unit.

24. An optical scanner method, comprising:
reflecting light from a first mirror unit by deforming the first mirror unit along at least a first torsion axis to reflect incident light;
reflecting light from a second mirror unit by deforming the second mirror unit along at least a second torsion axis that is different from the first torsion axis;
reflecting light reflected from the first mirror unit to the second mirror unit; and
generating a two dimensional scan of the light incident to the first mirror upon reflection from the second mirror unit through control of at least the deformations of the first mirror unit and second mirror unit, with operations of the third mirror unit.

25. The method of claim 24, further comprising:
vibrating the first mirror unit to accomplish the deforming of the first mirror unit to rotate about the first torsion axis; and
vibrating the second mirror unit to accomplish the deforming of the second mirror unit to rotate about the second torsion axis.

26. The method of claim 24, wherein, in the two dimensionally scanning of the light incident to the first mirror unit, upon reflection from the second mirror unit, the first mirror unit generates a horizontal vertical scan of the incident light incident to the first mirror unit and the second mirror unit generates a vertical scan of light reflected from the third mirror unit.

27. The method of claim 26, wherein the first mirror unit, the second mirror unit, and the third mirror unit, respectively, each comprise single mirrors.

* * * * *